Patented June 4, 1935

2,003,295

UNITED STATES PATENT OFFICE 2,003,295

CELLULOSE DERIVATIVE COMPOSITION

Emmette F. Izard, Elsmere, Del., assignor to E. I. du Pont de Nemours & Company, Wilmington, Del., a corporation of Delaware No Drawing. Application December 9, 1932, Serial No. 646,498

12 Claims. (Cl. 106—40)

This invention relates to cellulose derivative compositions and, more particularly, to cellulose derivative compositions including bis-aryloxyalkyl ethers as plasticizers. This application is a continuation in part of my copending application Serial No. 546,924, filed June 25, 1931, entitled Poly ethers.

Heretofore, a few bis-aryloxyalkyl ethers were known, but the use of such compounds in cellulose derivative compositions was not known.

An object of the present invention is to provide improved cellulose derivative compositions for use in the coating and plastic arts, including bis-aryloxyalkyl ethers. Other objects will be apparent from the description of the invention given hereinafter.

The above objects are accomplished according to the present invention by employing a bis-aryl ether of a polyglycol as the plasticizer in cellulose derivative compositions.

The method of preparing the ethers employed in the present invention is immaterial and does not form any part of the invention. They may be conveniently prepared by reacting dichlorodialkyl ethers (Cl—R·OR—Cl where R represents an alkylene group) with a phenol or naphthol in the presence of an alkali metal hydroxide at an elevated temperature.

The temperature at which the reaction may be carried out can be varied widely, although it is preferred to keep same between 100–200° C. Caustic soda may be used as the alkali metal hydroxide in the reaction, or other alkali metal hydroxides, such as caustic potash, may be used.

The reaction may be carried out in the presence of a high boiling inert solvent, such as toluol, as this gives a more convenient reaction mass to handle, although the use of an inert solvent is by no means necessary.

The following examples are given to illustrate the preparation of several bis-aryloxyalkyl ethers employed as plasticizers in cellulose derivative compositions according to the present invention:—

*Example 1—Bis-cresyloxyethyl ether.*—Two hundred and twenty-five parts cresol were dissolved in 100 parts xylol, then 80 parts caustic soda were added. The mixture was heated to 130° C., at which temperature a homogeneous solution was formed. One hundred and forty-five parts dichlorodiethyl ether were slowly added with stirring while the reaction mixture was kept just at the refluxing point. The mixture was heated for an hour after all the dichlorodiethyl ether had been added. The product was washed with water to remove sodium compounds and was then distilled in vacuo. The bis-cresyloxyethyl ether prepared according to this method distills between 240–245° C. at 15 mm. pressure and is a water-white liquid.

*Example 2 — Bis-orthomethoxyphenoxyethyl ether.*—A mixture containing 240 parts guaiacol, 80 parts caustic soda, and 100 parts xylol was heated to 130° C. One hundred and thirty parts dichlorodiethyl ether were slowly added with stirring while the temperature was kept just at the refluxing point. After all the dichlorodiethyl ether had been added the mixture was distilled until the temperature rose to 190° C. The product was washed with water, then distilled in vacuo. The product, bis-orthomethoxyphenoxyethyl ether, distills between 260–275° C. at 25 mm. pressure and is a white solid melting at 60° C.

*Example 3 — Bis - orthochlorophenoxyethyl ether.*—A mixture of 275 parts orthochlorophenol and 85 parts caustic soda was heated to 130° C., at which point 145 g. dichlorodiethyl ether were slowly added with stirring. After the addition of dichlorodiethyl ether was complete, the mixture was refluxed under an air condenser which would allow water vapor to escape until the temperature of the mixture had reached 185° C. The product was washed with water and distilled in vacuo. Bis-chlorophenoxyethyl ether distills between 250–270° C. at 15 mm. pressure and is a colorless liquid.

*Example 4—Bis-xyloxyethyl ether.*—A mixture containing 260 parts xylenol, 85 parts caustic soda, and 145 parts dichloroethyl ether was heated to boiling under an air condenser which allowed the water vapor to escape but condensed the other vapors. After 4 hours' heating the temperature had risen to 180° C. The product was washed with water and distilled in vacuo. Bis-xyloxyethyl ether distills between 260–270° C. at 15 mm. pressure.

Naphthols may be used in place of phenols to obtain naphthol derivatives. The substituted naphthols and phenols included within the scope of the present invention include those containing hydrocarbon radicals, such as methyl, ethyl, phenyl, cyclohexyl radicals, and the like; also halogens such as fluorine, chlorine, or bromine; alkoxy groups such as methoxy, ethoxy, and butoxy groups; carbalkoxy groups such as carbomethoxy, et cetera; et cetera. Where cresol is used, it may be the ortho, meta, or para, or merely the commercial cresol including a mixture of these. The aryl radicals of the ethers prepared as above, are, it is to be noted, radicals whose free valence belongs to the nucleus and not to a side chain, being thus aryl radicals in the true sense of the word.

In the above examples, dichlorodiethyl ether has been used and the resulting ethers are bis-aryloxyethyl ethers. In place of dichlorodiethyl ether other dichlorodialkyl ethers may be used, as β,β'-dichlorodiisopropyl ether, γ,γ'-dichlorodipropyl ether, and the higher homologs of these ethers, such as can be made by dehydrating alkylene chlorhydrins or by reacting dichloromethyl ether with olefines. In this way bis-aryloxypropyl ethers and the higher homologs of these derivatives may be prepared.

The ethers above described are either colorless liquids or white solids, very insoluble in water but soluble in ordinary lacquer solvents such as alcohols, ketones, esters, and hydrocarbons. They are compatible in equal proportions with pyroxylin and ethyl cellulose and are compatible in somewhat lower ratios with other cellulose esters, such as cellulose acetate, cellulose propionate, cellulose butyrate, cellulose acetobutyrate, cellulose nitroacetate, and the like, and other cellulose ethers, such as benzyl cellulose. These ethers are extremely high boiling and when used in cellulose derivative compositions give products of substantially permanent flexibility.

The following examples are given to illustrate cellulose derivative coating compositions containing the ethers of the present invention:—

Example 5

| | Parts |
|---|---|
| Ethyl cellulose | 4 |
| Bis-cresyloxyethyl ether | 1 |
| Solvent | 24 |

Example 6

| | Parts |
|---|---|
| Cellulose nitrate | 12 |
| Pigment | 16.3 |
| Damar | 3.5 |
| Castor oil | 2.6 |
| Bis-orthochlorophenoxyethyl ether | 4.0 |
| Solvent | 161.6 |

Example 7

| | Parts |
|---|---|
| Cellulose nitrate | 10 |
| Bis-xylyloxyethyl ether | 12 |
| Pigment | 10 |
| Solvent | 20 |

Example 8

| | Parts |
|---|---|
| Ethyl cellulose | 4 |
| Bis-cresyloxypropyl ether | 1 |
| Solvent | 24 |

Example 9

| | Parts |
|---|---|
| Cellulose nitrate | 10 |
| Bis-xylyloxybutyl ether | 12 |
| Pigment | 10 |
| Solvent | 20 |

In the above examples the term "solvent" is used to designate any suitable mixture of esters, alcohols, and hydrocarbons such as would be obvious to one skilled in the art. The above coating compositions give tough, flexible films which have excellent water resistance.

The following examples illustrate typical plastic compositions containing the ethers of the present invention:—

Example 10

| | Parts |
|---|---|
| Cellulose nitrate | 100 |
| Bis-orthochlorophenoxyethyl ether | 35 |
| Filler (including color) | 200 |

Example 11

| | Parts |
|---|---|
| Ethyl cellulose | 100 |
| Bis-xylyloxyethyl ether | 20 |

Example 12

| | Parts |
|---|---|
| Benzyl cellulose | 100 |
| Bis-orthomethoxyphenoxyethyl ether | 25 |

Example 13

| | Parts |
|---|---|
| Ethyl cellulose | 100 |
| Bis-xylyloxypropyl ether | 20 |

Example 14

| | Parts |
|---|---|
| Benzyl cellulose | 100 |
| Bis-orthomethoxyphenoxybutyl ether | 25 |

The above examples are given as specific illustrations of the invention, which includes cellulose derivative compositions using a bis-aryl ether of a polyglycol as a plasticizer. The polyglycol ethers, both binuclear (naphthyl derivatives) and mononuclear (phenol derivatives), are highly compatible with cellulose nitrate and alkyl cellulose ethers; the polyglycol ethers of mononuclear phenols show better compatibility with cellulose acetate and the aryl cellulose ethers than do the polyglycol ethers of polynuclear phenols, and therefore, it is preferred to use the polyglycol ethers of the mononuclear phenols as plasticizers for cellulose acetate and aryl cellulose ethers.

The above compositions may be prepared with or without the use of volatile solvents or diluents, such as alcohol for cellulose nitrate compositions, toluol-alcohol mixtures for the cellulose ether compositions, et cetera. Any part of the plasticizers in the above compositions may be replaced by other plasticizers of the group coming within the scope of this invention, or by one or more of the heretofore known plasticizers, such as triphenyl phosphate, dibutyl phthalate, camphor, tricresyl phosphate, et cetera.

Likewise in the above compositions, other resins than damar may be used, such as the synthetic resins of the polyhydric alcohol-polybasic acid or phenol-formaldehyde type.

The compositions disclosed herein are suitable for the preparation of lacquers for coating metal and wood, dopes for coating fabrics, and in plastic compositions to be used in the preparation of toilet ware, novelties, sheeting, safety glass sandwich material, rods, tubes, and the like.

A particular advantage of the use of these ethers in cellulose derivative compositions is that the resulting compositions have superior flexibility and water resistance, and maintain their flexibility substantially indefinitely, due to the low vapor pressure of these ethers. As a result, the durability of products made from these compositions is greatly increased.

As many apparently widely different embodiments of this invention may be made without departing from the spirit and scope thereof, it is to be understood that the invention is not limited to the specific embodiments thereof except as defined in the appended claims.

I claim:

1. A composition comprising a cellulose derivative and a bis-aryl ether of a polyglycol, the aryl radical being taken from the group consisting of phenyl and naphthyl radicals containing a substituent of the class consisting of methyl, ethyl, phenyl, cyclohexyl, fluorine, chlorine, bromine, methoxy, ethoxy, butoxy, and carbomethoxy.

2. A composition comprising a cellulose de-derivative and a bis-aryl ether of diethylene glycol the aryl radical being taken from the group consisting of phenyl and naphthyl radicals containing a substituent of the class consisting of methyl, ethyl, phenyl, cyclohexyl, fluorine, chlorine, bromine, methoxy, ethoxy, butoxy, and carbomethoxy.

3. A composition comprising a cellulose derivative of the class consisting of cellulose nitrate and cellulose ethers and a bis-aryl ether of diethylene glycol, the aryl radical being taken from the group consisting of phenyl and naphthyl radicals containing a substituent of the class consisting of methyl, ethyl, phenyl, cyclohexyl, fluorine, chlorine, bromine, methoxy, ethoxy, butoxy, and carbomethoxy.

4. A composition comprising a cellulose derivative and bis-methoxyphenoxyethyl ether.

5. A composition comprising a cellulose derivative from the group consisting of cellulose nitrate and cellulose ethers, and bis-methoxyphenoxyethyl ether.

6. A composition comprising ethyl cellulose and bis-methoxyphenoxyethyl ether.

7. A composition comprising a cellulose derivative and bis-chlorophenoxyethyl ether.

8. A composition comprising a cellulose derivative from the group consisting of cellulose nitrate and cellulose ethers and bis-chlorophenoxyethyl ether.

9. A composition comprising ethyl cellulose and bis-chlorophenoxyethyl ether.

10. A composition comprising a cellulose derivative and bis-cresyloxyethyl ether.

11. A composition comprising a cellulose derivative from the group consisting of cellulose nitrate and cellulose ethers and bis-cresyloxyethyl ether.

12. A composition comprising ethyl cellulose and bis-cresyloxyethyl ether.

EMMETTE F. IZARD.